United States Patent [19]

Pirklbauer et al.

[11] Patent Number: 5,454,852
[45] Date of Patent: Oct. 3, 1995

[54] CONVERTER FOR THE PRODUCTION OF STEEL

[75] Inventors: Wilfried Pirklbauer, Niederneukirchen; Johann Grabner, Linz; Sieghart Kaspar, Neuhofen, all of Austria

[73] Assignee: Voest-Alpine Industieanlagenbau GmbH, Austria

[21] Appl. No.: 262,860

[22] Filed: Jun. 21, 1994

[30] Foreign Application Priority Data

Jun. 21, 1993 [AT] Austria ................................ 1213/93

[51] Int. Cl.⁶ ..................................... C21C 5/52
[52] U.S. Cl. ..................... 75/10.42; 75/10.2; 266/218; 266/225; 373/22; 373/60
[58] Field of Search ................. 75/10.42, 10.2; 373/22, 60; 266/218, 225

[56] References Cited

U.S. PATENT DOCUMENTS

| 3,316,082 | 4/1967 | Barloga et al. | 75/10.2 |
| 3,556,771 | 1/1971 | Bruning | 75/10.42 |
| 3,708,599 | 1/1973 | Krause | 373/22 |
| 3,902,889 | 9/1975 | Malin | 75/10.42 |

FOREIGN PATENT DOCUMENTS

| 232531 | 3/1964 | Austria . |
| 372110 | 9/1983 | Austria . |
| 376702 | 12/1984 | Austria . |
| 382639 | 3/1987 | Austria . |
| 0257450 | 8/1987 | European Pat. Off. . |
| 0449258 | 10/1991 | European Pat. Off. . |
| 148706 | 2/1904 | Germany . |
| 1458917 | 10/1969 | Germany . |
| 2540009 | 4/1976 | Germany . |
| 2730973 | 1/1978 | Germany . |
| 2115011 | 9/1983 | United Kingdom . |

Primary Examiner—Peter D. Rosenberg
Attorney, Agent, or Firm—Ostrolenk, Faber, Gerb & Soffen

[57] ABSTRACT

A converter for the production of steel from solid and/or liquid charging substances, such as pig iron and/or scrap and/or sponge iron, includes a refractorily lined refining vessel, a refining device for feeding oxygen or an oxygen-containing gas, and a heating device. In order to obtain the maximum output possible at high scrap charging as well as a high purity of the steel, the heating device includes at least one self-consuming graphite electrode and the refining device, independent of the heating device, either is formed by an oxygen-blowing lance or includes oxygen-containing bottom and/or lateral tuyeres located below the melt bath level.

22 Claims, 2 Drawing Sheets

CONVERTER FOR THE PRODUCTION OF STEEL

BACKGROUND OF THE INVENTION

1. Field of the Invention

The invention relates to a converter for the production of steel from solid and/or liquid charging substances, such as pig iron and/or scrap and/or sponge iron, comprising a refractorily fined refining vessel, a refining means feeding oxygen or an oxygen-containing gas and a heating means, as well as to a process for producing steel.

2. Description of the Related Art

It is already known (AT-B-232.531) to supply missing heat to the charging substances by means of burners in order to attain the desired tapping temperature or to selectively increase the scrap charge, wherein a blast pipe including an oxygen blowing pipe and a fuel supply pipe is provided as a heating-refining means. Through the fuel supply pipe, oil or natural gas, i.e., a fossil fuel, is injected into the refining gas.

It is true that by this known arrangement the scrap charge may be increased, yet also the required charging time increases with the scrap portion, because the flame must work itself through the scrap charged, which is present above the molten pig iron. The oxygen supplied does not ignite before the flame has smelted sufficient scrap as far as to the pig iron bath level, which takes a relatively long time.

From AT-B-372.110 a converter for the production of steel from solid and liquid charging substances, such as pig iron and scrap, is known, which comprises a heating-refining means, wherein the heating-refining means is comprised of a plasma burner, a jacket surrounding the plasma burner and destined for supplying oxygen, as well as a cooling jacket surrounding this jacket. A converter comprising a plasma burner provided for smelting scrap, furthermore, is known from U.S. Pat. No. 3,316,082, wherein a central oxygen-gas introduction is provided. A furnace including a water-cooled tungsten burner and an oxyen supply duct, furthermore, is known from U.S. Pat. No. 3,556,771.

By these known plasma heating means and tungsten electrodes, respectively, an additional energy supply is feasible; yet, frequent leakages occur on account of the water cooling of the plasma cathodes, which result in unbearable losses of productivity and high maintenance costs. The problem of leakages occurring is particularly aggravated if oxygen blowing is performed at the same time the plasma burner is set in operation. A further problem with such burners resides in that the amount of energy supplied is limited upwardly, because the water cooling conducts away a major part of the thermal energy.

From EP-A-0 257 450 an electric arc furnace is known, in which the supply of carbonaceous fuels and oxygen-containing gases is provided for the purpose of saving energy. The oxygen is injected obliquely downwards into the furnace through blowing means fixedly arranged in the upper furnace region. The gas flow forming sucks in the reaction gases derived from the scrap and the melt forming, and burns the same. With this electric arc furnace, an accordingly increasing charge of coal is required with an increased charge of scrap. This means that—similar to AT-B-232.531—electric energy is replaced with fossil energy in order to reach higher production outputs. This involves metallurgical drawbacks, such as increased N, H and S contents. Another disadvantage is in that the charging time (tap-to-tap time) is very long with electric arc furnaces due to a totally different melt control technology (flat bath) as compared to converter technology.

From AT-B-376.702 a metallurgical vessel is known, through whose ceiling several hollow electrodes are guided in each of whose cavities one gas feeding tube is guided in a liftable and lowerable manner. For the purpose of metallurgical treating of the most diverse steel grades, that vessel facultatively may be operated:

a) as an electric arc furnace for smelting charging substances and/or fluxes, by retracting the tube mouth to behind the mouth of the hollow electrode, b) as a plasma furnace for melting charging substances or fluxes at an elevated energy input, by displacing the tube mouth as far as to, or slightly in front of, the mouth of the hollow electrode and simultaneously feeding a plasma-generating gas, or c) as a refining converter, by displacing the tube mouth to beyond the mouth of the hollow electrode, if desired, until immersion in a bath of the molten charging substances and feeding an oxygen-containing gas while interrupting the current supply.

Since the introduction of electric energy is not possible during the blowing procedure, substantially more carbon than is required with common melting must be added to the charged scrap also in that case, which, again, involves the disadvantages described above.

In addition, the combined electrode and gas feeding tube liftable and lowerable in a cavity of the electrode involve great mechanical expenditures. There is the danger that the movability of the gas feeding tube relative to the electrode, in particular, the constant precise readjustment of the gas feeding tube, cannot be maintained due to the extensive heat caused by the plasma gas and due to the risk of contamination.

SUMMARY OF THE INVENTION

The invention aims at avoiding the above described disadvantages and difficulties and has as its object to provide a converter of the initially defined kind as well as a process for producing steel, which enable a productivity as high as possible, i.e., charging times as short as possible, wherein either scrap alone or in addition to charged pig iron or also pig iron alone (if desired, while charging a coolant, such as, ore, limestone) may be facultatively processed. Maximum refining speeds are of particular importance in the production of steel while retaining the qualitative advantages, such as low N, H and S contents of the steel, to be obtainable with an oxygen blowing converter.

In accordance with the invention, this object is achieved in that the heating means comprises at least one self-consuming graphite electrode and the refining means, independent of the heating means, either is formed by an oxygen-blowing lance or comprises oxygen-blowing bottom and/or lateral tuyeres located below the melt bath level. With the electrode (or electrodes) being moved in the converter, simultaneous melting and refining is feasible while saving the electrodes to a maximum degree, i.e., avoiding extreme electrode wear.

Thereby, it is possible to combine the advantages of a fast-blowing oxygen blowing converter with the advantages of electric arc furnaces having high melting inputs, wherein, however, the invention is based on converter technology, with which the solids/pig iron charge may be varied as desired by means of electric arc heating while attaining maximum refining speeds. The high output of the converter according to the invention results from high oxygen blowing rates that may be applied with the high carbon content of the charged material, which would not be realizable with an electric arc furnace on account of the flat bath control and of the structure of the vessel totally differing from that of a converter.

The converter according to the invention can be used with a special advantage, in particular, in fields where neither an oxygen blowing converter nor an electric arc furnace can work efficiently, i.e., at a charging portion of pig iron ranging from about 30 to 70%.

Advantageously, two or more self-consuming graphite electrodes are provided, wherein, with direct current operation, suitably one of the graphite electrodes is switched anodically and the other graphite electrode is switched cathodically.

In order to ensure a uniform electrode consumption and a uniform wear of the refractory lining of the converter, the graphite electrodes suitably are connected to a changeover switch alternating anodic switching to cathodic switching and vice versa.

According to an advantageous embodiment, the electrodes are cathodically switched and one or several bottom anodes are provided in the bottom of the converter, thus enabling a very high energy input and hence a particularly short tap-to-tap time.

Another preferred embodiment is characterized in that three graphite electrodes are provided with rotary current operation.

Suitably, the converter is equipped with bottom flushing tuyeres destined for introducing a flush gas.

It goes without saying that the converter may be equipped with auxiliary means destined for introducing fluxes and/or fossil energy if advantageous to process control.

Preferably, the graphite electrodes are arranged beyond the longitudinal central axis of the converter and also beyond the flue chimney to be connected to the converter mouth, which offers substantial advantages in servicing and maintaining the electrodes or the electrode retaining means since the electrodes are easily accessible.

A process according to the invention for the production of steel from pig iron and/or scrap and/or sponge iron, based on the use of a converter is based on converter technology, by refining with oxygen or an oxygen-containing gas and by introducing electrically produced heat by burning an electric arc on at least one self-consuming graphite electrode.

A process that is of special advantage, in particular, if bulky scrap is to be smelted is characterized in that in a first process step primary refining of pig iron and, if desired, of a partial amount of scrap and/or sponge iron is carried out and subsequently in a second process step additionally charged scrap and/or sponge iron is melted and, if desired, at the same time or in a third process step refining takes place, wherein in the first process step only the refining means is activated and in further process steps both the refining means and at least one graphite electrode are activated, i.e., alternately when top-blowing oxygen and alternately or simultaneously when blowing in oxygen from below the melt bath level.

If small size scrap or sponge iron is to be melted in the first place, both the graphite electrodes and the refining means suitably are activated from the very beginning, scrap and/or sponge iron being added to the pig iron already present in the converter continuously and/or in batches.

BRIEF DESCRIPTION OF THE DRAWINGS

In the following, the invention will be explained in more detail by way of several embodiments and with reference to the accompanying drawing, wherein.

DETAILED DESCRIPTION OF THE PREFERRED EMBODIMENTS

Figure 1:
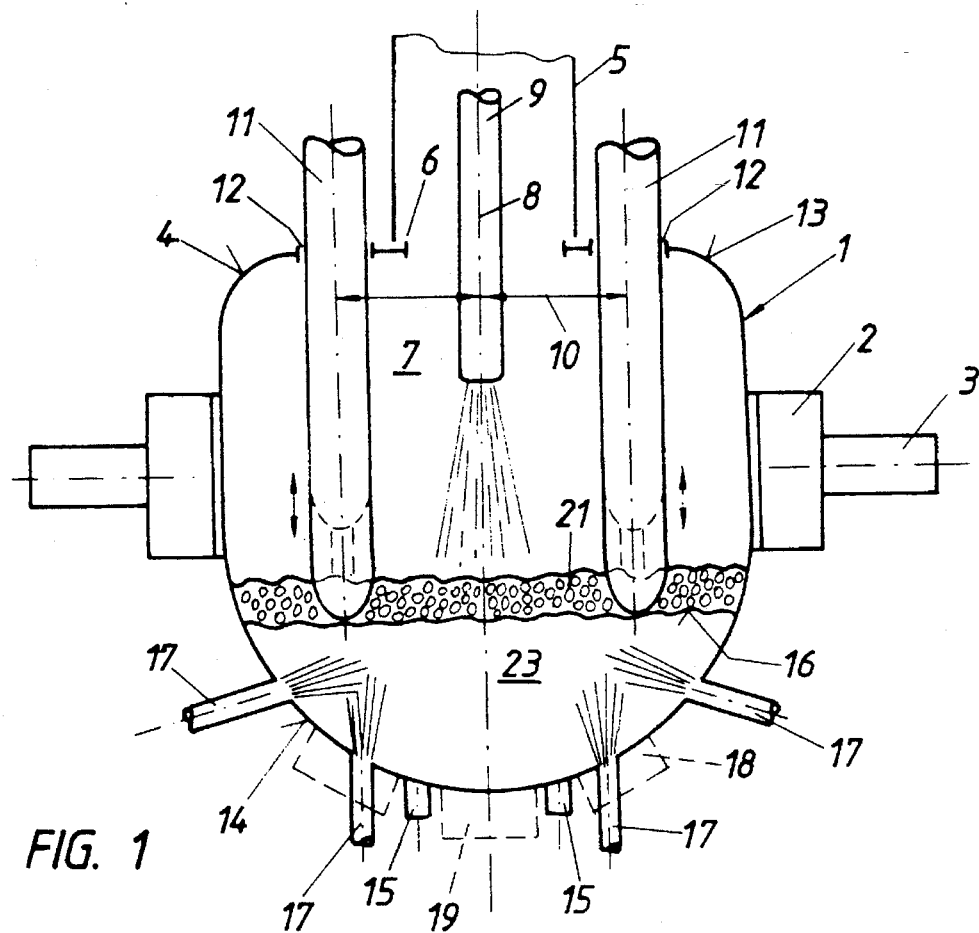
FIG. 1 is a longitudinally sectioned illustration of a converter according to the invention.
Figure 2:
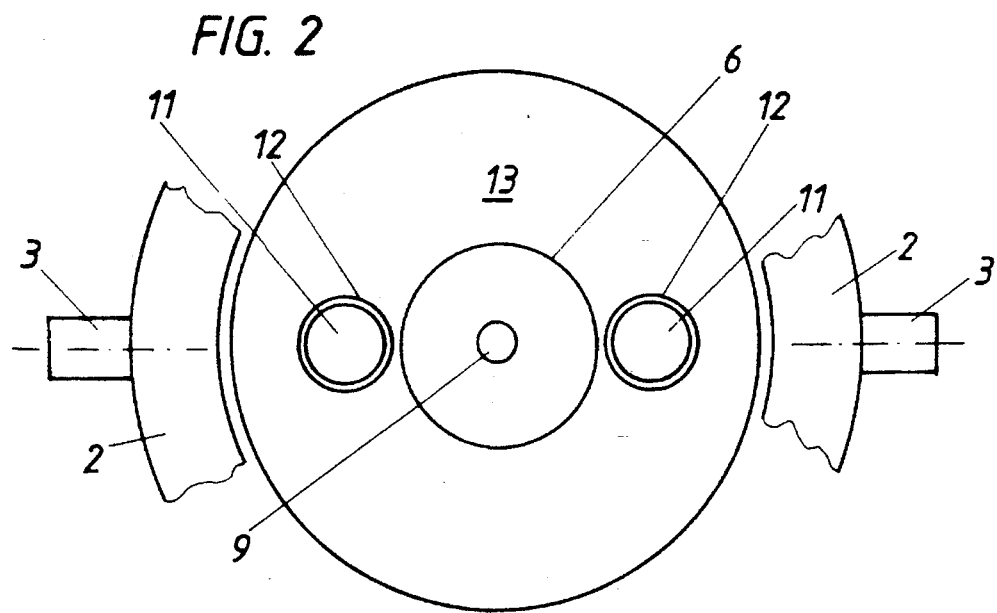
FIG. 2 is a top view on this converter in schematic illustration.

A refining vessel of a tiltable converter is denoted by 1, which converter is tiltably mounted in a converter stand via trunnions 3 arranged on a carrying ring 2. The refining vessel 1 comprises a metallic external jacket 4 internally provided with a refractory lining not illustrated. A flue 5 may be joined with the converter mouth 6.

In the upright position of the converter, an oxygen blowing lance 9 projects centrally into the interior 7 of the refining vessel 1, which blowing lance is liftable and lowerable along the longitudinal central axis 8 of the upright converter and is introducible into the interior 7 from above through the converter mouth 6. At a lateral distance 10 from this oxygen blowing lance 9, two self-consuming graphite electrodes 11 project into the interior 7 of the refining vessel 1, which electrodes are arranged diametrically opposite each other in respect of the longitudinal central axis of the upright converter. These electrodes 11 are introduced through separate electrode openings 12, which are provided in the converter hood 13. As is schematically indicated in the drawing, the electrodes 11 are liftable and lowerable and, as a whole, can be pulled out of the refining vessel 1 upwardly. The electrodes 11 are operable together, individually or alternately.

In the bottom 14 of the refining vessel 1, bottom flushing tuyeres 15 for feeding flush gas are provided. Furthermore, bottom and lateral tuyeres 17 are provided in the bottom 14 and in the side walls, respectively, at a level below the usual melt bath level 16, through which oxygen or an oxygen-containing gas may be introduced.

If the electrodes 11 are switched cathodically, two bottom anodes 18 are arranged in the bottom of the refining vessel. Instead of the two bottom anodes 18, a single central bottom anode 19 could also be provided.

Figure 3:
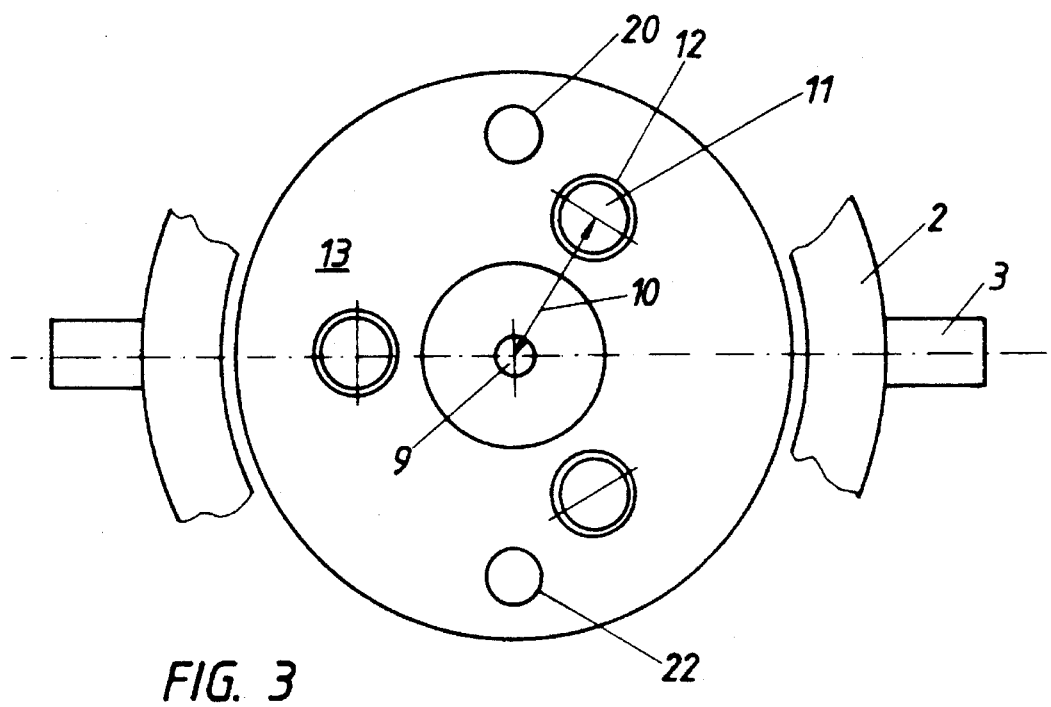
FIG. 3 is a top view on another embodiment of a converter.

According to the embodiment represented in FIG. 3, three self-consuming graphite electrodes 11 for direct or rotary current operation are provided at a distance 10 from the blowing lance 9 and parallel to the same. From FIG. 3, it is, furthermore, apparent that a separate tap hole 20 for slag 21 and a separate tap hole 22 for steel 23 are provided on the converter hood 13.

If it were necessary for the converter operation to introduce fluxes and/or fossil energy, additional means required for such purpose, as are frequently provided at converters, may be incorporated, which, however, is not illustrated.

A converter according to the invention can be operated in various ways. For instance, primary refining of the pig iron already charged into the converter and of a partial amount of scrap may be carried out in a first process step without using the electrodes 11 (which, in that case have been pulled out of the refining vessel 1). Additionally charged scrap is melted only in a second process step using the electrodes 11 and is completely refined, complete refining being realized either simultaneously with the second process step or only after melting in a third process step. This mode of operation is of particular advantage if bulky scrap is to be processed.

Another mode of operation, which is advantageous, in particular, when charging small size scrap, provides for heating and refining simultaneously from the very beginning, which means that the refining means 9, 17 and the electrodes 11 are in operation at the same time. Scrap and/or sponge iron may then be added continuously or in batches.

The addition of fluxes and/or fossil energy as well as the introduction of flush gas are feasible at any point of time during the process. Moreover, the converter according to the invention also may be operated in the sump operation.

The special advantages of the converter according to the invention and of the process according to the invention for operating the same reside in the high flexibility of composing the metallic charge, which may range from a 100% liquid charge (pig iron) to a 100% solids charge (scrap and/or sponge iron). Moreover, the maximum output may be obtained also when continuously charging the solids charge at a high bulk density.

In the following, the production of steel by means of a KMS (Klöckner-Maxhütte Steel Production Process) converter and the production of steel by means of a bottom-blowing converter according to the invention will be compared:

With both converters, the tap weight was 140 tons, the yield was 89%, based on a production time of 6,800 hours/year. In both cases 53.6% molten pig iron, 13.6% scrap, 6.9% solid pig iron, and 25.9% sponge iron were charged.

When using a KMS converter, a tap-to-tap time of 55 minutes and a primary blowing time of 33 minutes resulted, which involved non-productive times of 22 minutes. In addition to the above described charge, a coal charge was required for the KMS converter, namely 90 kg anthracite/ton of steel, which was introduced into the converter in dusty form through bottom nozzles. The annual output resulting was 1.039 million tons.

When using the converter according to the invention, primary refining was carried out in a first process step, 84 tons of molten pig iron, 21 tons of scrap, and 11 tons of solid pig iron, i.e. 116 tons in total, having been charged. To completely refine this charge, a theoretic blowing time of 13 minutes at a non-productive time of 22 minutes was necessary, which corresponds to a tap-to-tap time of 35 minutes. However, blowing was not completed, but blowing was interrupted at about 85% of the blowing time, i.e., after approximately 11 minutes. The C content then was 0.5%, the FeO content less than 5%.

In a second process step, electric energy was introduced by aid of the self-consuming graphite electrodes 11, wherein, at the same time, 41 tons of sponge iron of a predetermined composition were continuously charged at 3 tons/minute. The electrodes were fed by means of a 140 MVA transformer, which corresponds to an input of about 100 MW. The charging time was approximately 14 minutes.

The overall blowing time (first and second process step together) was 11 minutes+14 minutes, i.e., 25 minutes. Hence follows a tap-to-tap time of 47 minutes, including the non-productive time of 22 minutes. From this, an annual production of 1.215 million tons results, which means an increase in production by 17% as compared to the above-described production of steel by means of the KMS converter.

If, on the other hand, the charge of a converter according to the invention is compared with the charge of a KMS converter, based on an annual production of 1.039 million tons reached by the KMS converter, a 120-ton converter with a 120 MVA transformer results.

Even the use of a conventional LD converter equipped with electric heating in the sense of the invention, i.e., with self-consuming graphite electrodes 11, yields an advantageous production increase, although a secondary blowing time of 3 minutes is required after having introduced the sponge iron. This results in an overall blowing time of 28 minutes and, thus, a tap-to-tap time of 50 minutes, based on a non-productive time of 22 minutes. Thereby, an annual production amounting to 1.142 million tons is feasible, which still constitutes an increase by 10% as compared to the use of a KMS converter. Hence, it follows that equipping a conventional LD converter with electric heating in the form of self-consuming graphite electrodes is suitable despite the investment costs involved.

In addition to the above described advantage of obtaining a substantially elevated productivity by the converter according to the invention and by the process according to the invention as compared to a KMS converter, the following advantages are achieved:

- a lower offgas volume,
- a better yield,
- lower N and H contents in the steel, as well as
- a lower S content in the steel.

The additional costs for the electric equipment of the converter according to the invention are largely equalized as compared to the KMS converter and KMS process, by the blowing technique required in this process. The contaminations of the bath with carbon caused by the burning away of the graphite electrodes are of no relevance according to the invention, because complete refining is effected with $O_2$.

What we claim is:

1. A converter arrangement for producing steel from solid and liquid charging substances, including pig iron, scrap, and sponge iron, comprising:

a converter, the converter comprising a refractorily lined steel-refining vessel adapted to accommodate an iron melt bath, refining means for feeding one of oxygen and an oxygen-containing gas into the vessel, and a heating means within the converter, said heating means comprising at least one self-consuming graphite electrode independent of and laterally spaced from said refining means.

2. A converter arrangement as set forth in claim 1, wherein said refining means is comprised of an oxygen-blowing lance.

3. A converter arrangement as set forth in claim 1, wherein said refining means comprises at least one of oxygen-blowing bottom tuyeres and oxygen-blowing lateral tuyeres, said tuyeres being located below a level of said melt bath.

4. A converter arrangement as set forth in claim 1, wherein said heating means comprises at least two self-consuming graphite electrodes.

5. A converter arrangement as set forth in claim 2, wherein, with direct current operation, one of said at least two graphite electrodes is switched anodically, the other of said at least two graphite electrodes being switched cathodically.

6. A converter arrangement as set forth in claim 3, further comprising a changeover switching means connected to said graphite electrodes and adapted to alternate anodic switching to cathodic switching and vice versa.

7. A converter arrangement as set forth in claim 2, wherein, with direct current operation, said graphite electrodes are cathodically switched, and which further comprises at least one bottom anode provided in said converter bottom.

8. A converter arrangement as set forth in claim 2, wherein, with rotary current operation, said heating means comprises three graphite electrodes.

9. A converter arrangement as set forth in claim 1, further comprising bottom flushing tuyeres destined for introducing flush gas.

10. A converter arrangement as set forth in claim 1, further comprising auxiliary means destined for introducing at least one of fluxes and fossil energy.

11. A converter arrangement as set forth in claim 1, wherein said converter has a longitudinal central axis and a converter mouth, and which further comprises a flue chimney adapted to be connected to said converter mouth, said at least one graphite electrode being arranged beyond said longitudinal central axis and also beyond said flue chimney.

12. A process for producing steel from solid and liquid charging substances including pig iron, scrap and sponge iron carried out in a converter arrangement including a converter, a refractorily-lined refining vessel, an oxygen-blowing refining means, and a heating means comprised of at least one self-consuming graphite electrode, the process comprising the steps of:

refining the solid or liquid charging substances with the refining means by introducing one of oxygen and an oxygen-containing gas, and introducing electrically-produced heat independently of said refining means by burning an electric arc on said at least one self-consuming graphite electrode spaced from the refining means.

13. A process as set forth in claim 12, which process further comprises the steps of:

performing a first process step comprising primary refining of pig iron, only said refining means being activated during said first step; and performing a second process step comprising melting of at least one of scrap and sponge iron charged in addition to pig iron, both said refining means and at least one graphite electrode are activated during said second step.

14. A process as set forth in claim 13, wherein said second process step further comprises simultaneous refining.

15. A process as set forth in claim 13, which further comprises a third process step comprising refining and carried out subsequently to said second process step.

16. A process as set forth in claim 13, wherein said first process step further comprises primary refining of a partial amount of at least one of scrap and sponge iron.

17. A process as set forth in claim 13, wherein, in said second process step, both said refining means and said at least one graphite electrode are activated alternately while top-blowing oxygen and one of alternately and simultaneously while blowing in oxygen from below the level of said melt bath.

18. A process as set forth in claim 15, wherein, in said second and third process steps, both said refining means and said at least one graphite electrode are activated alternately when top-blowing oxygen and one of alternately and simultaneously while blowing in oxygen from below the level of said melt bath.

19. A process as set forth in claim 12, wherein both said at least one graphite electrode and said refining means are activated from the very beginning while adding at least one of scrap and sponge iron to pig iron already contained in said converter.

20. A process as set forth in claim 19, wherein adding of said at least one of scrap and sponge iron is effected continuously.

21. A process as set forth in claim 19, wherein adding of said at least one of scrap and sponge iron is effected in batches.

22. A process as set forth in claim 19, wherein adding of said at least one of scrap and sponge iron is effected continuously and in batches.

* * * * *